Aug. 25, 1925.

A. HADDOCK 1,551,150

ELECTRICAL INDUCTANCE APPARATUS

Filed Dec. 30, 1922

Inventor:
Arthur Haddock,
by E.W. Griggs Att'y

Patented Aug. 25, 1925.

1,551,150

UNITED STATES PATENT OFFICE.

ARTHUR HADDOCK, OF EAST ORANGE, NEW JERSEY, ASSIGNOR TO WESTERN ELECTRIC COMPANY, INCORPORATED, OF NEW YORK, N. Y., A CORPORATION OF NEW YORK.

ELECTRICAL INDUCTANCE APPARATUS.

Application filed December 30, 1922. Serial No. 610,071.

*To all whom it may concern:*

Be it known that I, ARTHUR HADDOCK, a citizen of the United States, residing at East Orange, in the county of Essex, State of New Jersey, have invented certain new and useful Improvements in Electrical Inductance Apparatus, of which the following is a full, clear, concise, and exact description.

The present invention relates to electrical inductance apparatus and more particularly to the type of apparatus in which a plurality of windings is employed, the mutual inductance relation between which is capable of variation.

An object of the invention is to improve the stability and efficiency in operation of apparatus of this character and, at the same time, to simplify the construction and design so that the apparatus is capable of manufacture at small cost.

The inductance of the invention is of the general type employing a fixed winding and a movable winding, either of which may comprise one or more sections of winding. The movable winding is mounted for rotation with respect to the fixed winding, and a feature of the invention is a type of mounting for the movable coil which insures an accurate setting of the rotatable coil with respect to the fixed coil at all times, this mounting at the same time being of simple design and construction and capable of being assembled quickly. Other features of the invention relate to the bearings, the connecting terminals and other parts of the construction as will be pointed out more fully hereinafter.

The inductance apparatus of the invention may be used in a well known manner either as a single inductance element the inductance value of which may be varied, or as a plurality of inductances mutually related to each other and capable of having their mutual inductance varied. The invention is capable of general application, but is particularly adapted for use in connection with apparatus and systems employing relatively high frequency currents, such as are met with in radio transmission.

Figure 1:
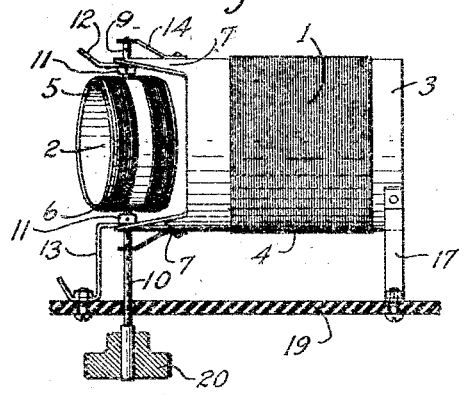
Figure 2:
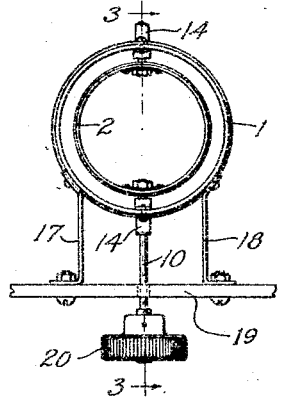
Figure 3:
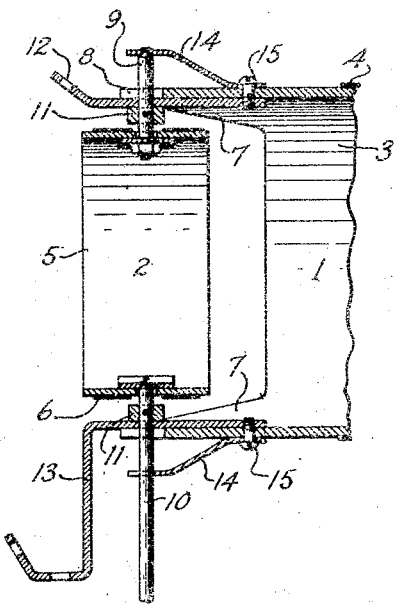
Figure 4:
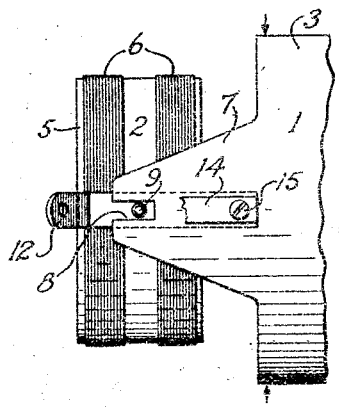

A more detailed description of the invention will now be given with particular reference to the accompanying drawings, in which Fig. 1 shows a side elevation of the assembled inductance of the invention; Fig. 2 is an end view of the inductance of Fig. 1 looking from the right; Fig. 3 is a partial longitudinal section taken along the line 3—3 of Fig. 2 with the coil 2 in a different position of adjustment; and Fig. 4 is a partial top view of Fig. 1 with certain parts broken away to show the construction of the bearing, and with the coil 2 in the same position as in Fig. 3.

The inductance apparatus shown in Fig. 1 comprises a fixed coil generally indicated at 1, and a movable coil generally indicated at 2, the coil 2 being mounted for rotation with respect to the coil 1. The coil 1 consists of a tubing 3 of suitable material such as composition board, fibre or the like, on which a number of turns of suitably insulated wire are wound to provide the winding 4. Similarly the coil 2 comprises a relatively short tubing 5 of preferably smaller diameter than the tubing 3, and a winding 6 which for convenience of construction may be divided into two portions as shown. The tubing 3 is provided at one end with two longitudinally projecting portions 7 for supporting the rotatable coil. In the manufacture of the apparatus, the tubing 3 would ordinarily be cut as a section from stock tubing, in which case the extending portions 7 which are left integral with one tube may be taken from the recessed portion of the next section to be cut. That is, in order to save material, the projections 7, 7 of the sections that are successively cut from the stock tubing may be staggered with respect to each other. As shown in Figs. 3 and 4 the extensions 7 are slotted at 8 for a purpose presently to be described.

The extensions 7 integral with the tubing 3 offer advantages other than that of simplicity of construction. For example the tubing material that is ordinarily used does not offer great resistance against breakage or tearing out of screw holes and the like. For this reason it is of advantage to have the movable coil supported from points sufficiently back from the edge of the tubing. The projecting portions 7 permit the screws 15 to be placed deep in the body of the tubing. The extensions 7 being integral with tubing 3 require no means of attachment such as screws or clamps between the extensions and the tubing. Cutting away the portions between the extensions 7 enables the use of a movable coil 2 of nearly the same diameter as tubing 3, it being a simple matter to make the collars 11 very thin. At the same time the placing of screws 15 in the extending portions enables the winding 4 to be carried close to the end of the tubing 3, if desired, so that for the position of maximum coupling the winding 4 extends to close proximity with the winding 6.

The rotatable coil 2 is provided with two stub shafts 9 and 10 secured to the coil 2 at diametrically opposite points in any suitable manner as by means of a shoulder and thread on each stub shaft and a plate and nut as shown on the inside of the tubing 5. The plate is secured to the tubing 5 in any suitable manner as by rivets and the shoulder on the respective stub shaft bears against the plate, the portion of reduced diameter passing through the plate. Each stub shaft may carry a spacing collar 11 secured to the respective shaft in any suitable manner as by a pin extending through the shaft and the collar. A bearing for the shaft 9 is provided in a plate or bearing member 12, which preferably extends a suitable distance inside the tubing 3 and projects outside to form a contact terminal to which a lead may be soldered or otherwise secured. A bearing for the shaft 10 is provided in a plate 13 which also extends a suitable distance within the tubing 3 and is formed on the opposite end to provide a support for the coil as a whole, and to provide also a terminal to which a lead may be attached. A pair of spring members 14 is provided for the respective shafts, these springs being secured by the screws 15 to the respective bearing plates 12 and 13. Each of these screws serves also to clamp its respective spring 14, bearing plate 12 or 13 and tubing 3 firmly together, the screw having a snug fit in the hole through the tubing. The uppermost spring 14 of Fig. 3 may be flexed downwardly against the outer extremity of the stub shaft 9. It is preferred to make the end of shaft 9 conical and to provide a small hole in the spring 14, over the point on the shaft. This secures spring 14 against displacement and the friction keeps a bright contact and maintains the fit as wear progresses. The lower of the two springs shown in Fig. 3 is preferably forked at its free end, and the shaft 10 is included between the two extensions of the form. The spring cooperating with the shaft 10 is preferably flexed to exert a force in the direction against shaft 10, to the left as viewed in Fig. 3. The springs 14 perform the double function of supplying an approximately constant amount of friction to the rotating coil 2 and as electrical contacts for the winding 6 of the coil 2. The circuit through the movable coil between the connection terminals 12 and 13 is by means of the screws 15, the springs 14 and the respective stub shaft 9 or 10 to the respective terminal of the winding 6.

A second and third support for the assembled coil may be provided by the legs 17 and 18 secured to the end of the tubing 3 opposite the rotating coil. The three legs 13, 17 and 18 may be secured to any suitable support such as a panel indicated at 19. The stub shaft 10 may be extended through the support 19 and may be provided with a suitable handle 20 and an index (not shown) for indicating to an operator the angular position of the coil 2.

No terminals are indicated in the drawing for the winding 4, since the two ends of the wire may conveniently project through the tubing 3 in accordance with usual practice and may be either soldered directly to connecting leads or provided with suitable screw or solder terminals not shown, or if desired may be brought out to the legs 17 and 18 from which connection may be made to any desired external circuit.

In assembling the inductance of the invention the coils 1 and 2 are assumed to be wound in the form in which they are to be used. The stub shafts 9 and 10 with their bearing plates 12 and 13 are secured to the coil 2. This movable coil assembly is then inserted endwise into the slots 8 provided in the projecting portions 7 of the tubing 3. The collars 11 are preferably positioned to cause the plates 12 and 13 to bear outwardly against the inner side of the tubing 3, and it is convenient in inserting the movable coil assembly into the slots 8 to exert a pressure inwardly on the tubing 3 at right angles to the diameter through the bearings points, that is, at the points indicated by the two arrows in Fig. 4. A slight pressure at these points, which may be applied by the thumb and finger of the workman, will cause the projecting portions 7 to separate slightly and allow the bearing members 12 and 13 to be readily inserted. The slotted portions 8 should be fairly true as to width, but may have any convenient depth. The position of the coil 2 longitudinally of the tubing 3, is determined entirely by the screws 15 which, as stated, are given an accurate fit through the corresponding holes in the wall of the tubing 3. These holes may conveniently be drilled with accuracy by means well known in the art. After the bearing members 12 and 13 have been inserted to the proper distance into the tubing 3, the springs 14 are applied and the screws 15 secured in place. The entire assembly of the coil may be accomplished in a few minutes or less time and it should be noted that it is only necessary to insert two screws 15, 15 in order to secure the assembly of the rotating coil to the tubing 3.

The coils may be proportioned as to size and as to number of turns and style of winding, spacing, etc., to give any desired electrical characteristics. The circuit above traced for the rotatable winding 6 is conductively separate from the winding 4 and is suitable for use when the inductance of the invention is to be used as a variable coupler. If desired, however, one terminal of the winding 6 may be brought out to the terminal 13 and the opposite end of the winding 6 may be connected from either the terminal 12 or the screw 15 across to one end of the winding 4 so that the windings 4 and 6 are in series. With this type of connection the inductance may serve as a variable self inductance.

The stub shafts 9 and 10, the bearing plates 12 and 13, and the supports 17 and 18 are preferably of non-magnetic material such as brass, and the springs 14 are preferably of phosphor bronze.

What is claimed is:

1. As an article of manufacture, a tubing having an electrical winding thereon; a rotatable coil having a shaft of rotation; and a unitary member forming in common a bearing for said shaft of rotation, a means of attachment of said rotatable coil to said tubing, a support for said rotatable coil and said tubing, and an electrical terminal for said rotatable coil.

2. In an inductance apparatus, a fixed coil comprising a tubing having a winding thereon, a rotatable coil having a shaft of rotation, bearing plates for said shaft, means for securing said rotatable coil against lateral or circumferential displacement with respect to said fixed coil comprising diametrically-opposite, inwardly-extending longitudinal slots in said tubing, said shaft being positioned in said slots, and means to secure said rotatable coil against longitudinal displacement with respect to said fixed coil comprising a fastening member between each of said bearing plates and said tubing.

3. In an inductance apparatus, a fixed coil comprising a tubing having a winding thereon, said tubing being cut as a section from stock tubing in such a way as to leave integral with said section a pair of extending portions at one of its ends, positioned diametrically opposite each other, an electrical winding on said tubing, said tubing being provided with a pair of inwardly extending longitudinal slots in the ends of said extending portions, a rotatable coil of less diameter than said tubing, a pair of stub shafts secured to said rotatable coil, said shafts each extending respectively through a said slot, and means securing said rotatable coil against displacement along said slots and permitting rotation of said rotatable coil with its said shafts.

In witness whereof, I hereunto subscribe my name this 28th day of December A. D., 1922.

ARTHUR HADDOCK.